United States Patent [19]

Wasserman

[11] 4,250,958
[45] Feb. 17, 1981

[54] DOUBLE TUBULAR THERMAL ENERGY STORAGE ELEMENT

[76] Inventor: Kurt J. Wasserman, P.O. Box 77, Port Jervis, N.Y. 12771

[21] Appl. No.: 57,552

[22] Filed: Jul. 16, 1979

[51] Int. Cl.³ .............................................. F28D 21/00
[52] U.S. Cl. ........................................ 165/46; 62/439;
165/104 S; 165/49; 165/53; 126/430; 219/325
[58] Field of Search ................ 165/46, 104 S; 62/439,
62/530; 126/436, 400, 430; 219/325

[56] References Cited

U.S. PATENT DOCUMENTS

| | | | |
|---|---|---|---|
| 2,106,263 | 1/1938 | Winter | 165/104 S X |
| 2,146,058 | 2/1939 | Doyle | 62/439 X |
| 3,462,968 | 8/1969 | Puta et al. | 165/46 X |
| 3,744,272 | 7/1973 | Oldberg | 62/439 |
| 4,104,185 | 8/1978 | Schroder | 165/104 S X |

Primary Examiner—Albert W. Davis
Attorney, Agent, or Firm—Jack D. Slobod

[57] ABSTRACT

An elongated flexible elastomer or plastic double tube structure for storing heat energy includes inner and outer flexible tubes held in coaxial relationship by integral angularly spaced apart webs which divide up the annular space between the tubes into angularly spaced apart segments. The segments are filled with phase change material such as salt hydrate. The annular space is sealed at opposite ends by sealing the outer tube against the inner tube and the inner tube provides a conduit for the passage of a heat transfer fluid, such as water, through the structure.

8 Claims, 5 Drawing Figures

DOUBLE TUBULAR THERMAL ENERGY STORAGE ELEMENT

FIELD OF THE INVENTION

The present invention relates to thermal energy storage apparatus for heating or cooling purposes. In its particular aspects the present invention relates to the provision of a phase change material within the annular space defined between inner and outer flexible coaxial tubes in order that a fluid may be run through the inner tube to carry thermal energy to or from the phase change material.

BACKGROUND OF THE INVENTION

Heretofore, many salt hydrates and their eutectics have been identified which are useful in storing thermal energy for environmental heating or cooling use. Such compounds generally have melting points ranging between 40 degrees Fahrenheit and 120 degrees Fahrenheit and have a heat of fusion in excess of 50 BTU per pound. The most well known of these compounds is sodium sulfate decahydrate ($Na_2SO_4.10H_2O$).

When such a compound is sealed in a relatively thin walled plastic or elastomeric container, some water in the liquid phase of the compound is eventually lost by diffusion through the walls of the container, reducing the energy storage efficiency of the compound.

Another phenomenon which reduces the energy storage efficiency of a salt hydrate compound is vertical separation of the compound due to incongruent melting in which, for example, in the case of sodium sulfate decahydrate, some anhydrous sodium sulfate crystals are formed which sink to the bottom of the container and are separated from water at the top of the container by a layer of sodium sulfate decahydrate crystals formed therebetween. One solution to this problem has been the provision of elaborate means for mechanical mixing or stirring. Another solution proposed has been the use of a clay-like homogenizing agent such as magnesium aluminum silicate. It is known that this vertical separation phenomenon does not markedly affect the energy storage efficiency of the salt hydrate if the effective vertical height of the container is no more than about one-half inch.

Another difficulty which has existed concerning the use of salt hydrate for thermal energy storage is that no suitable container therefor has been available which may be housed within walls, ceilings or floors of a building.

OBJECTS OF THE INVENTION

It is an object of the present invention to provide heat energy storage apparatus in which a container for phase change material includes a means for heat transfer to or from the phase change material.

It is another object of the present invention to provide an energy storage apparatus in which a container for salt hydrate is configured to enable water flow used for energy transfer to replace moisture lost from the salt hydrate.

It is a further object of the present invention to provide an elongated flexible container for phase change material which may be bent back and forth over or alongside itself in order to fill space within building walls, ceilings or floors.

It is yet another object of the present invention to provide thermal energy storage apparatus in which a container for salt hydrate has a relatively small vertical height for minimizing the effect of vertical separation of the salt hydrate.

SUMMARY OF THE INVENTION

Briefly, the aforementioned and other objects of the invention are satisfied by providing thermal energy storage apparatus which includes an elongated plastic or elastomeric double tubular container composed of inner and outer tubes held in substantially coaxial relationship by spacer means. A phase change material fills the annular space between the inner and outer tubes. The annular space is sealed at opposite ends of the container by sealing the outer tube against the inner tube.

A fluid such as water is circulated through the inner tube as means of heat transfer between the phase change material and a remotely located source of heat such as a solar collector. The inner and outer tubes are of the same material. Therefore when salt hydrate is used as the phase change material, the minute amount of moisture diffusing from the salt hydrate through the wall of the outer tube is balanced by moisture diffusing through the wall of the inner tube into the salt hydrate.

The container is fashioned to be quite flexible and is of a length that it may be bent 180 degrees without pinching the cross section of the container with a bend radius on the order of three diameters or less. This construction enables the container to be laid horizontally and successively bent back and forth over or alongside each succeeding horizontal span in order to relatively tightly fill the space within walls, floors or ceilings of a building.

The spacer means is preferably in the form of a plurality of angularly spaced apart integral webs radially directed between the inner and outer tubes in order to divide the annular space between the tubes into angularly separated segments. The segments preferably have a maximum cross-section dimension of approximately one-half inch, in order that when the container is laid horizontally, there is insufficient vertical extent in each salt hydrate filled segment to enable vertical separation of the components of the salt hydrate upon melting. Furthermore, with the addition of well-known thickening and nucleating agents to the salt hydrate, larger cross-sectional dimensions may be used.

Other objects, features and advantages of the present invention will become apparent upon perusal of the following description of the preferred embodiments of the invention when taken in conjunction with the appended drawing wherein:

DETAILED DESCRIPTION OF THE PREFERRED EMBODIMENTS

Figure 1:
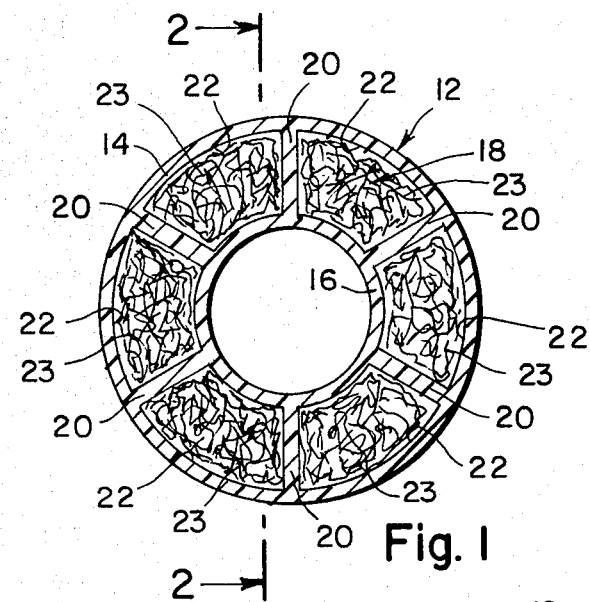
FIG. 1 is a transverse cross-sectional view of the thermal energy storage apparatus of the present invention.

In accordance with the principles of the present invention, with reference primarily to FIG. 1 of the drawing, storage apparatus is provided which comprises an elongated, flexible, preferably integral extruded double tubular member 12 of plastic or elastomeric material. Member 12 is preferably of polyolefin plastic, cross-linked polyolefin, EPDM or EPT synthetic rubber (ethylene-propylene-terpolymer) and is preferably at least eight feet and up to several hundred feet in length, generally 25-50 feet, and has a substantially constant wall thickness on the order of one-sixteenth to one-eighth of an inch. The plastic or elastomeric material utilized for the extrusion preferably is filled about 35 percent by weight with a thermally conductive material such as a metallic oxide, carbon black or metallic flakes to render all the walls of member 12 substantially thermally conductive.

Member 12 includes an outer tubular portion 14, about 1½ inches in diameter and an inner tubular portion 16 about ½ inch in diameter. Tubular portions 14 and 16 are concentric with each other and define an annular space 18 therebetween. Directed radially between the inner and outer tubular portions 14 and 16 within space 18 are a plurality of equi-angularly spaced apart integral webs 20 of the same wall thickness as the walls of tubular portions 14 and 16. Six webs 20 are preferably so provided to divide up annular space 18 into preferably six cavities or segments 22.

Member 12 is provided to have sufficient flexibility in order that a bend of 180 degrees in member 12 with a bend radius of three diameters will not pinch off the cross-section of member 12.

It should thus be apparent that member 12 comprises an outer tubular portion 16 and an inner tubular portion 14 and a spacer means in the form of webs 20, all integrally extruded.

Each of cavities 22 is filled throughout the length of member 12 with a phase change material 23 having a heat of fusion in excess of 50 BTU per pound and a melting point or transition temperature ranging between 40 and 120 degrees Fahrenheit. Suitable phase change materials are divided into three main categories; those with a melting point generally between 40° and 65° Fahrenheit and therefore suitable for storage of coolness, those with a melting point generally in the range of 65°-75° Fahrenheit and suitable for room temperature stabilization, and those with a melting point generally between 75° and 120° Fahrenheit and suitable for heat storage applications. Most preferable for use as a phase change material to fill annular space 18 are salt hydrates and their eutectics. Generally salt hydrates and their eutectics may be produced with any melting point desired within the range of 40° F. to 120° F. U.S. Pat. No. 2,989,856 granted June 27, 1971 to Maria Telkes is herein incorporated by reference. Therein, examples of salt hydrate eutectics are disclosed for melting points of 40° F., 52° F., 64° F., and in the range of 70° F. to 75° F. Further, many salt hydrates have melting points in the range useful for heating purposes. These are detailed in U.S. Pat. No. 3,986,969 granted Oct. 19, 1976 to Maria Telkes and includes Sodium Sulfate Decahydrate ($NA_2SO_4.10H_2O$), the most well-known salt hydrate for heat storage purposes.

The webs 20 and the tubular portions 14 and 16, being substantially thermally conductive, provide intimate thermal contact between phase change material 23 and the inner tubular portion 16.

Figure 2:
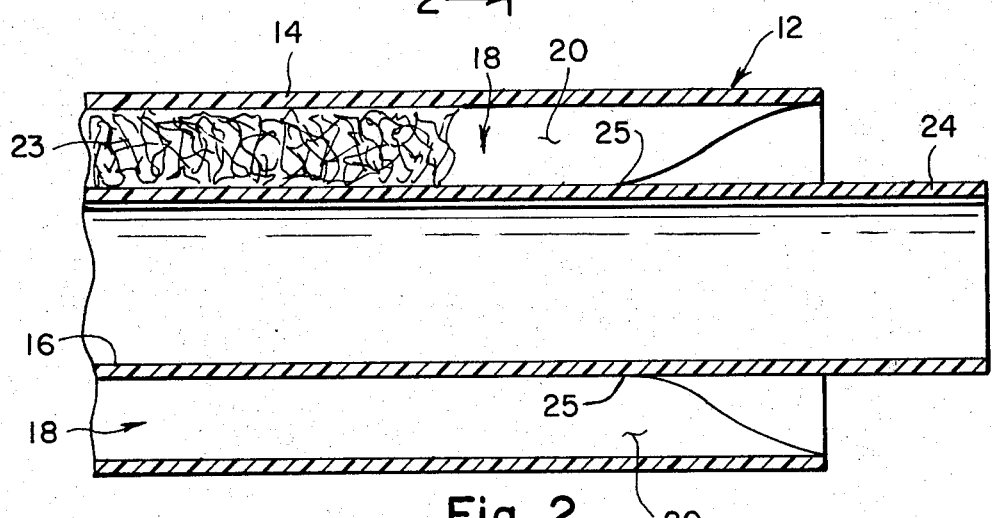
FIG. 2 is a longitudinal cross-sectional view taken through lines 2—2 in FIG. 1 at one end of the apparatus but prior to sealing.
Figure 3:
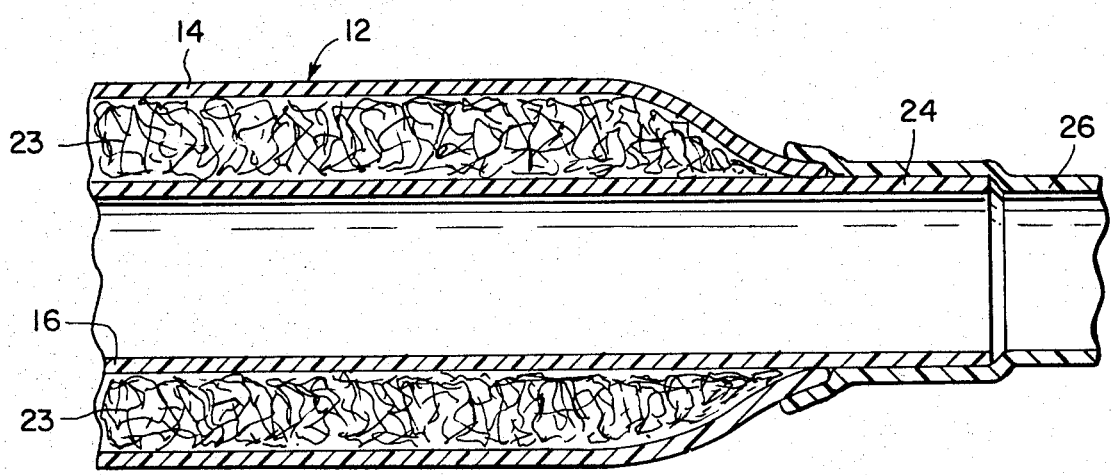
FIG. 3 is a longitudinal cross-sectional view of the same end as in FIG. 2 but after sealing.

Prior to filling member 12 with the phase change material, each end of member 12, as illustrated in FIG. 2, is prepared to enable sealing of annular space 18. In order to accomplish this, the outer tubular portion 14 is cut back to expose a short length 24, on the order of ¾ of an inch, of the inner tubular portion 16 which projects from the end of member 12. Further, webs 20 are cut back along an inclined line starting at the end of outer tubular portion 14 and ending at a point 25 on inner tubular portion 16 about ¾ inch longitudinally back within member 12. As shown in FIG. 3, this relief of webs 20 allows the end of outer tubular portion 14 to be bent radially inward against tubular portion 16 and sealed against portion 16 by adhesive or when the material of member 12 permits, as when it is extruded of polyolefin by heat sealing. In this manner first one end of member 12 is sealed, then while the temperature is maintained so as to keep the phase change material 23 in a substantially liquid or flowable semisolid, the material is forced into the cavities 22 through the other end of member 12. Thereafter the other end of member 12 is sealed in the same manner.

It will thus be appreciated that the annular space 18 of member 12 is filled with phase change material 23 and the annular space is sealed at both ends. The inner tubular member 16 provides a conduit for the passage of a heat transfer fluid, such as water, to be run in intimate thermal contact with phase change material 23 in view of the thermally conductive nature of all the walls of member 12. In order to permit such passage of heat transfer fluid a different plastic, elastomeric or metal tube 26 is inserted over or within each projecting end 24 of tubular portion 16 and adhesively secured thereto. Again, heat sealing may be utilized in place of adhesive if the materials of tube 26 and member 12 permit.

It will be further appreciated that by utilizing water as the heat transferring fluid within the inner tubular portion 16, when the phase change material 23 is a salt hydrate, any water lost from the salt hydrate by diffusion through outer tubular portion 14 will be replaced by diffusion of some of the heat transfer water through the inner tubular portion 16. Further, with the member 12 directed in a generally horizontal orientation, the cavities 22, being in the order of one-half inch in maximum cross-sectional dimension, are sufficiently small in vertical extent to prevent the lack of reversibility and consequent loss of energy storage efficiency which occurs with the incongruent melting and gravitational separation of the salt hydrate. Further, with the use of thickening and nucleating agents as described in the aforementioned U.S. Pat. No. 3,986,969 to Maria Telkes, the maximum cross-sectional dimensions of the cavities 22 may be larger than one-half inch because of the avoidance of gravitational separation of the salt hydrate.

Figure 4:
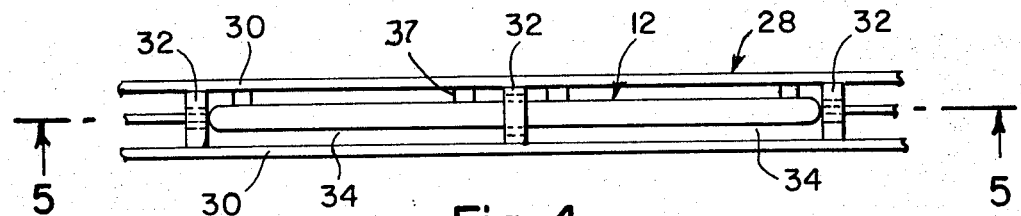
FIG. 4 is a top view of a wall in which the thermal energy storage apparatus of the present invention is installed.
Figure 5:
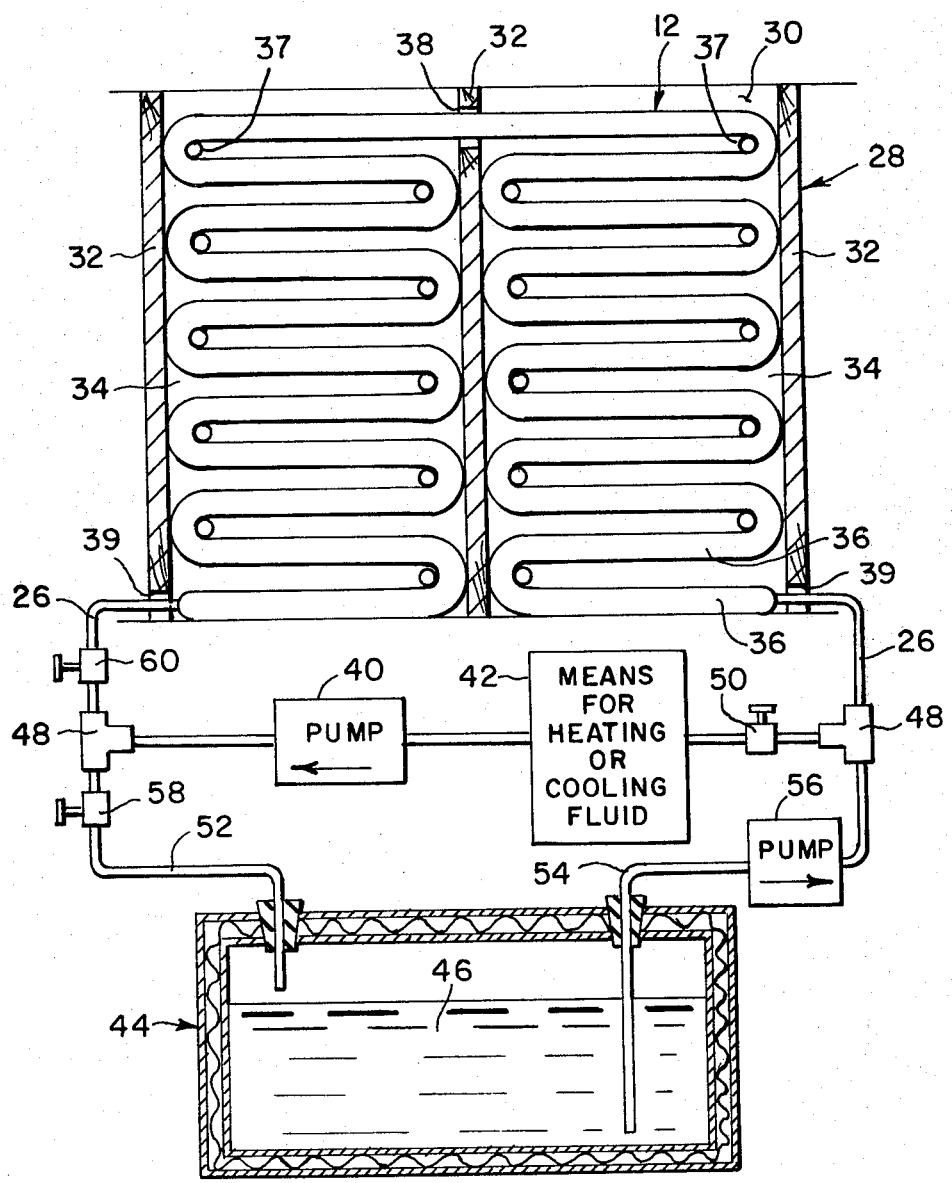
FIG. 5 is an elevational cross-sectional view through the lines 4—4 in FIG. 4 in conjunction with a system for supplying heat transfer fluid thereto.

Referring to FIGS. 4 and 5 of the drawing, member 12 when filled with phase change material and sealed according to the foregoing is used in conjunction with a preferably internal wall 28 of a building. Wall 28 consists of opposed wall sheets 30 spaced apart by vertical studs 32 which define a plurality of cavities 34 between the studs and wall sheets. The wall sheets are preferably metal plates or other substantially thermally conductive material. During the construction of wall 28, the member 12 is placed within the cavities 34 by running horizontal spans 36 of member 12, folding member 12 180 degrees at the end of each span in order to lay each successive span on top of the preceding span to fill substantially the entire cavity 34. In order to support spans 36 regularly spaced apart and in a horizontal orientation, pegs or dowels 37 may be provided projecting from one of wall sheets 30 to support member 12 at each point where it is bent. It is thus important that member 12 be sufficiently flexible to be bent 180 degrees with a radius on the order of three outside diameters of member 12 or less without pinching off the cross-section of member 12 and obstructing the flow of heat transferring fluid therethrough. Further as illustrated, a plurality of cavities 34 might be filled with one continuous length of member 12 by providing a notch or hole 38 in the stud 32 between adjoining cavities 34 to permit passage of member 12 therethrough. The tubes 26 attached to opposite ends of member 12 exit wall 30 through suitable holes 39 and are coupled together through a suitable electric pump 40 for recirculating the heat transferring fluid through the inner tubular portion of member 12, and suitable means 42 in series with pump 40 and remote from wall 28 for heating or cooling the heat transfer fluid. Whether heating or cooling means are used depends on the application and the consequent selection of the phase change material 23.

In heating applications, the means 42 preferably comprises a solar energy collector. In view of rate advantages given by electric companies for night consumption, it is also feasible to utilize the member 12, with appropriate selection of the phase change material 23 as previously indicated, for cooling applications in which the phase change material is cooled during the evening by utilizing the means 42 as suitable refrigeration device for cooling the heat transfer fluid. Thus the coolness might be stored to cool the building or structure during the day.

In heating applications, heat stored in member 12 is slowly transferred to the interior of the building through the wall sheets 30 while in cooling applications, heat is slowly taken in by the member 12 also through wall sheets 30. Furthermore, upper and lower vents (not shown) through wall sheets 30, might be provided in association with a fan (also not shown) positioned for setting up air currents flowing over member 12 and through these vents for additional heat transfer with the interior of the building.

It will be appreciated that when water is used as the heat transfer fluid, it may properly be heated by means 42 only to a temperature below the boiling point of water, since the member 12 is not capable of withstanding the pressure of steam. Once this point is approached, the electric pump 40 would normally have to be turned off to prevent further transfer fluid circulation through member 12. However, with the addition of a large thermally insulated storage tank 44 of water 46, the means 42 might be utilized to heat the water in tank 44, which heated water 46 might be used at a later time for circulation through member 12. Thus the tubes 26 are connected to tees 48 which couple member 12 to a first fluid path consisting of pump 40, means 42, and a manual valve 50; and a second path consisting of the storage tank 46, via input pipe 52 and output pipe 54 sealably entering the tank, a second electric pump 56, and a manual valve 58. Furthermore, a third manual valve 60 is provided in series with one of pipes 26 between member 12 and one of the tees 48.

In normal operation, valves 50 and 60 are open, pump 40 is turned on, valve 58 is closed and pump 56 turned off. These conditions produce heat transfer fluid circulation between means 42 and member 12. Once the heat transfer fluid approaches its boiling point, or the heat given off by member 12 to the surrounding environment becomes excessive, the valve 60 is closed, the valve 58 is opened, and pump 56 is also turned on. These conditions set up heat transfer fluid circulation between the means 42 and tank 44, by which the water 46 in the tank is heated by means 42 and stored for later use. Then when it is desired to circulate the water in tank 44 through member 12 for heating purposes, pump 40 is turned off, valve 50 is closed and valve 60 is opened. Thus, pump 56 circulates the water 46 in tank 44 through member 12.

Additionally, the entire system of FIGS. 4 and 5 of the drawing might be automated in an obvious fashion by replacing the manual valves 50, 58, and 60 with solenoid type valves and controlling the on-off states of the electric pumps 40 and 56 and the opened-closed states of the valves by thermostatic controls responsive to ambient and transfer fluid temperatures.

Other applications of the present invention are possible in which member 12 is for example coiled in a remote location from the space to be heated or cooled and the means 42 for heating or cooling the heat transfer fluid is selectively replaced by a radiator located within the space to be heated or cooled, when it is desired to utilize the heat or cold stored in member 12 to control the temperature of the space.

Furthermore, member 12 might be provided integrated into prefabricated wall panels, or might be laid with successive horizontal spans alongside each other within a floor. Additionally, member 12, rather than being within a wall might be laid in a horizontal serpentine fashion against a wall to also achieve a decorative effect.

While the preferred embodiments of the present invention have been described in specific detail, it should be appreciated that numerous modifications, substitutions, additions and deletions in and to said details are possible within the intended spirit and scope of the present invention.

I claim:

1. A thermal energy storage and transfer apparatus comprising:
   an elongated tubular container, said container comprising thermally conductive flexible inner and outer tubes defining an annular space therebetween and spacer means for maintaining said inner and outer tubes in substantially coaxial relationship, said tubes being composed of materials selected from plastics and elastomers;
   a phase change material having a heat of fusion of more than 50 BTU per pound and a melting point ranging between 40 and 120 degrees Fahrenheit within said annular space; and
   sealing means sealing said annular space at opposite ends of said container, said inner tube providing a conduit for running heat transferring fluid through said container in thermal contact with said phase change material;
   said spacer means comprising a plurality of angularly spaced apart webs spanning substantially the entire length of said container and being radially directed between the inner and outer tubes, said webs dividing said annular space into a plurality of elongated angularly spaced apart cavities between said webs, said phase change material being within said cavities.

2. The apparatus of claim 1 wherein said inner and outer tubes and said spacer means comprise an integral structure.

3. The apparatus of claim 1 wherein said phase change material consists essentially of salt hydrate.

4. The apparatus of claim 2 wherein said phase change material consists essentially of salt hydrate.

5. The apparatus of claim 1 wherein the walls of said inner and outer tubes have substantially the same permeabilities to the diffusion of water therethrough.

6. A thermal energy storage and transfer apparatus comprising:
- an elongated tubular container, said container comprising thermally conductive flexible inner and outer tubes defining an annular space therebetween, and spacer means for maintaining said inner and outer tubes in substantially coaxial relationship;
- a phase change material consisting essentially of salt hydrate having a heat of fusion of more than 50 BTU per pound and a melting point ranging between 40 and 120 degrees Fahrenheit within said annular space; and
- sealing means sealing said annular space at opposite ends of said container, said inner tube providing a conduit for running heat transferring fluid through said container in thermal contact with said phase change material;
- said spacer means comprising a plurality of angularly spaced apart webs spanning substantially the entire length of said container and being radially directed between the inner and outer tubes, said webs dividing said annular space into a plurality of elongated angularly spaced apart cavities, said webs and said sealing means being configured to prevent communication between said cavities, said phase change material being within said cavities.

7. The apparatus of claim 6 wherein said inner and outer tubes and said spacer means comprise an integral structure.

8. The apparatus of claim 6 wherein the walls of said inner and outer tubes have substantially the same permeabilities to the diffusion of water therethrough.

* * * * *